(12) United States Patent
Ahn et al.

(10) Patent No.: US 12,212,000 B2
(45) Date of Patent: Jan. 28, 2025

(54) POSITIVE ELECTRODE FOR LITHIUM-SULFUR BATTERY AND METHOD FOR MANUFACTURING SAME

(71) Applicant: LG ENERGY SOLUTION, LTD., Seoul (KR)

(72) Inventors: Jihoon Ahn, Daejeon (KR); Taek Gyoung Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 531 days.

(21) Appl. No.: 17/771,211

(22) PCT Filed: Jun. 30, 2021

(86) PCT No.: PCT/KR2021/008294
§ 371 (c)(1),
(2) Date: Apr. 22, 2022

(87) PCT Pub. No.: WO2022/005210
PCT Pub. Date: Jan. 6, 2022

(65) Prior Publication Data
US 2022/0367873 A1   Nov. 17, 2022

(30) Foreign Application Priority Data
Jul. 1, 2020 (KR) ........................ 10-2020-0080757

(51) Int. Cl.
*H01M 4/58* (2010.01)
*H01M 4/04* (2006.01)
(Continued)

(52) U.S. Cl.
CPC ....... *H01M 4/5815* (2013.01); *H01M 4/0416* (2013.01); *H01M 4/0435* (2013.01);
(Continued)

(58) Field of Classification Search
None
See application file for complete search history.

(56) References Cited

U.S. PATENT DOCUMENTS

2016/0336587 A1  11/2016  Jung et al.
2018/0138503 A1   5/2018  Kim et al.
(Continued)

FOREIGN PATENT DOCUMENTS

CN  107710463 A  2/2018
CN  109713282 A  6/2019
(Continued)

OTHER PUBLICATIONS

International Search Report (PCT/ISA/210) issued in PCT/KR2021/008294, dated Oct. 8, 2021.
(Continued)

*Primary Examiner* — Wyatt P McConnell
(74) *Attorney, Agent, or Firm* — Birch, Stewart, Kolasch & Birch, LLP (57) ABSTRACT

Disclosed is a positive electrode for a lithium-sulfur battery, including a current collector; and a positive electrode active material layer on the current collector, wherein the positive electrode active material layer includes a positive electrode active material and a binder, and the positive electrode active material layer has surface properties defined by the following $S_a$ (arithmetic mean surface roughness of the positive electrode) and $S_z$ (maximum height roughness of the positive electrode) ((i) 1 μm≤$S_a$≤5 μm, (ii) 10 μm≤$S_z$≤60 μm (wherein $S_a$ is the average value of the distance from the middle surface of the surface irregularity structure of the positive electrode to the highest point and the lowest point of each irregularity part, and $S_z$ means the distance from the lowest point to the highest point of the positive electrode)) and a method for manufacturing the same.

10 Claims, 4 Drawing Sheets

(51) Int. Cl.
    *H01M 10/052* (2010.01)
    *H01M 4/02* (2006.01)
(52) U.S. Cl.
    CPC .... *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2018/0331159 A1* | 11/2018 | Lee | H10K 39/32 |
| 2018/0351162 A1 | 12/2018 | Kim et al. | |
| 2019/0237750 A1 | 8/2019 | Kim et al. | |
| 2020/0136127 A1 | 4/2020 | Cho et al. | |
| 2020/0220177 A1 | 7/2020 | Kim et al. | |
| 2020/0235379 A1 | 7/2020 | Kim et al. | |
| 2021/0167385 A1 | 6/2021 | Lee et al. | |
| 2021/0242463 A1 | 8/2021 | Kim et al. | |

FOREIGN PATENT DOCUMENTS

| | | |
|---|---|---|
| CN | 111213268 A | 5/2020 |
| JP | 2000-82472 A | 3/2000 |
| JP | 2014-165131 A | 9/2014 |
| JP | 6285028 B2 | 1/2018 |
| JP | 2019-21805 A | 2/2019 |
| JP | 2019-125499 A | 7/2019 |
| KR | 10-2014-0122500 A | 10/2014 |
| KR | 10-2017-0081840 A | 7/2017 |
| KR | 10-1764470 B1 | 8/2017 |
| KR | 10-2018-0029874 A | 3/2018 |
| KR | 10-2018-0055230 A | 5/2018 |
| KR | 10-2018-0137989 A | 12/2018 |
| KR | 10-2019-0012973 A | 2/2019 |
| KR | 10-2019-0026990 A | 3/2019 |
| KR | 10-2019-0086874 A | 7/2019 |
| KR | 10-2040257 B1 | 11/2019 |
| KR | 10-2020-0003576 A | 1/2020 |
| WO | WO 2019/009560 A1 | 1/2019 |
| WO | WO 2019/078505 A1 | 4/2019 |
| WO | WO 2019/139397 A1 | 7/2019 |
| WO | WO 2020/069711 A | 3/2020 |
| WO | WO 2020/097872 A1 | 5/2020 |

OTHER PUBLICATIONS

Shaibani et al., "Expansion-tolerant architectures for stable cycling of ultrahigh-loading sulfur cathodes in lithium-sulfur batteries", Science Advances, vol. 6, No. 1. aaay2757, 2020, pp. 1-11.
Extended European Search Report for corresponding European Application No. 21831617.2, dated Dec. 23, 2022.

* cited by examiner

POSITIVE ELECTRODE FOR LITHIUM-SULFUR BATTERY AND METHOD FOR MANUFACTURING SAME

TECHNICAL FIELD

The present application claims the benefit of Korean Patent Application No. 10-2020-0080757 on Jul. 1, 2020 with the Korean Intellectual Property Office, disclosure of which are herein incorporated by reference in their entirety.

The present invention relates to a positive electrode for a lithium-sulfur battery and a method for manufacturing the same.

Background Art

As the application range of secondary batteries is expanded to not only small-size portable electronic devices, but also medium and large-size electric vehicles (EV) energy storage systems (ESS) and electric ships, the demand for lithium secondary batteries with high capacity, high energy density and long lifetime is rapidly increasing.

Among them, the lithium-sulfur secondary battery means a battery system using a sulfur-based material having an S—S bond (Sulfur-Sulfur Bond) as a positive electrode active material and using lithium metal as a negative electrode active material. Sulfur, which is the main material of the positive electrode active material, has properties in that it is rich in resources while having a low weight per atom, and thus easy to supply and receive, and also is cheap, can lower the manufacturing cost of the battery and is non-toxic and environmentally friendly.

In particular, the lithium-sulfur battery has a theoretical discharging capacity of 1,675 mAh/g-sulfur, and theoretically, it can realize a high energy storage density of 2,600 Wh/kg compared to its weight. Therefore, since the theoretical energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1,000 Wh/kg, Na—S battery: 800 Wh/kg and lithium-ion battery: 250 Wh/kg), the lithium-sulfur battery is receiving a lot of attention in the mid-to-large-sized secondary battery market that is being developed so far.

The lithium-sulfur battery has a positive electrode, a negative electrode, a separator, and an electrolyte as basic components, and among them, the positive electrode corresponds to the main component of the lithium-sulfur battery in that the positive electrode active material can have a great influence on the performance of the battery. The positive electrode can be prepared by first adding a binder and a solvent to the positive electrode active material to prepare a slurry of the positive electrode active material in a fluid form, and then coating the slurry on a current collector and drying it.

However, when manufacturing a positive electrode for a conventional lithium-sulfur battery, since the slurry of the positive electrode active material having a fluidity, that is, a low solid concentration is used, there was a problem that after coating by a coating equipment, the time for heating and drying process is long, so the production speed of positive electrode is slow. In order to overcome this, there was an attempt to use a slurry of a positive electrode active material having a high solid concentration, but in the case of a slurry having a high solid concentration, there was a limitation in that due to the lack of flowability, it is difficult to manufacture electrodes through the existing coating process.

Additionally, Science Advances, 3 Jan. 2020: Vol. 6, no. 1, eaay2757, which is a prior art document (paper) related to the preparation of the slurry of the positive electrode active material, discloses that in the case of a method of preparing a slurry by adding water to the mixture formed by mixing the sulfur/carbon composite and the binder in a dry state, when the positive electrode is manufactured, a web-like bridging bond or a ribbon-like bridging bond is formed between the positive electrode active materials to increase the bonding force between the particles of the active materials The above prior art document discloses the characteristics of a bonding structure between particles of positive electrode active materials depending on a method of preparing a slurry, but has a limitation in that it does not disclose a specific solid concentration of the positive electrode active material that can further improve the bonding force and also it does not disclose at all a method for manufacturing a positive electrode through a slurry having a high solid concentration without flowability.

Therefore, there is a need for research and development on a positive electrode for lithium-sulfur battery and a method for manufacturing the same, which is capable of improves the bonding force between positive electrode active materials, the surface characteristics of the positive electrode, and the capacity and stability of the battery, while improving the process efficiency by shortening the drying process of the positive electrode for lithium-sulfur battery and improving the production speed.

(Non-Patent Document 1) (Paper 1) Science Advances, 3 Jan. 2020: Vol. 6, no. 1, eaay2757.

DISCLOSURE

Technical Problem

In order to solve the above problems, the inventors of the present invention have studied the application of a pressing process using a roll press in the manufacture of a positive electrode using a slurry of a positive electrode active material having a high solid concentration without flowability, and thus have completed the present invention.

Therefore, it is an object of the present invention to provide a method of manufacturing a positive electrode for a lithium-sulfur battery, which is capable of reducing the cost of the drying process and improving the production speed by shortening the drying time in the process of manufacturing the positive electrode. In addition, it is another object of the present invention is to provide a positive electrode for a lithium-sulfur battery and a method for manufacturing the same, which is capable of improving the adhesive force of the positive electrode and making the surface irregularities of the positive electrode small, through the bridging bond between positive electrode active materials with high solid concentration, and thus improving the surface characteristics and the stability of the battery.

Technical Solution

According to a first aspect of the invention, the present invention provides a positive electrode for a lithium-sulfur battery comprising a current collector; and a positive electrode active material layer formed on at least one surface of the current collector, wherein the positive electrode active material layer comprises a positive electrode active material and a binder, and the positive electrode active material layer has surface properties defined by the following $S_a$ (arithmetic mean surface roughness of the positive electrode) and $S_z$ (maximum height roughness of the positive electrode): (i) 1 µm≤$S_a$≤5 µm, (ii) 10 µm≤$S_z$≤60 µm (wherein $S_a$ is the average value of the distance from the middle surface of the surface irregularity structure of the positive electrode to the highest point and the lowest point of each irregularity part, and $S_z$ means the distance from the lowest point to the highest point of the positive electrode).

In one embodiment of the present invention, the adhesive force between the current collector and the positive electrode active material layer may be 6.5 to 9.5 gf/cm.

In one embodiment of the present invention, the positive electrode may have a porosity of 50 to 80%.

In one embodiment of the present invention, the sulfur loading amount of the positive electrode may be 1 to 10 mAh/cm².

In one embodiment of the present invention, the positive electrode active material may comprise one selected from the group consisting of elemental sulfur, sulfur-based compounds, sulfur-carbon composites, and combinations thereof.

According to a second aspect of the invention, the present invention provides a method of manufacturing a positive electrode for a lithium-sulfur battery, comprising the steps of, (1) mixing the sulfur-carbon composite and the binder and then adding water to prepare a slurry of positive electrode active material; (2) placing the slurry of the positive electrode active material on the current collector and then covering it with a release film to prepare a structure in the order of the current collector—the slurry—the release film; (3) compressing the structure using a roll press; (4) removing the release film from the compressed structure to prepare a positive electrode; and (5) drying the positive electrode, wherein in step (1), the solid concentration of the slurry of the positive electrode active material is 50 to 70 wt. %.

In one embodiment of the present invention, step (1) may be a step of mixing sulfur-carbon composite and binder in a ratio of 90:10 to 98.5:1.5.

In one embodiment of the present invention, in step (3), the roll gap of the roll press may be 100 to 200 µm.

In one embodiment of the present invention, step (5) is a step of drying by heating, and the drying temperature may be 40 to 90° C.

According to a third aspect of the invention, the present invention provides a lithium-sulfur battery comprising the positive electrode above.

Advantageous Effects

The positive electrode for the lithium-sulfur battery according to the present invention has small irregularities due to its excellent surface properties, so that non-uniform growth of the negative electrode and the formation of dendrites can be prevented, and has excellent adhesive force as an effect due to the bridge-type structure between the positive electrode active materials.

In addition, the method of manufacturing a positive electrode for a lithium-sulfur battery according to the present invention has the advantage of reducing the drying time of the positive electrode during the process and thus reducing the cost of the drying process during the manufacture of the positive electrode and improving the production speed of the positive electrode.

BEST MODE

The embodiments provided according to the present invention can all be achieved by the following description. It is to be understood that the following description is to be understood as describing preferred embodiments of the present invention, and the present invention is not necessarily limited thereto.

Positive Electrode for Lithium-Sulfur Battery

The present invention provides a positive electrode for a lithium-sulfur battery, comprising a current collector; and a positive electrode active material layer formed on at least one surface of the current collector, wherein the positive electrode active material layer comprises a positive electrode active material and a binder and the positive electrode active material layer has surface properties defined by the following $S_a$ (arithmetic mean surface roughness of the positive electrode) and $S_z$ (maximum height roughness of the positive electrode):

$$1\ \mu m \leq S_a \leq 5\ \mu m \qquad (i)$$

$$10\ \mu m \leq S_z \leq 60\ \mu m \qquad (ii)$$

(wherein $S_a$ is the average value of the distance from the middle surface of the surface irregularity structure of the positive electrode to the highest point and the lowest point of each irregularity part, and $S_z$ means the distance from the lowest point to the highest point of the positive electrode).

In this specification, $S_a$ (arithmetic mean surface roughness of the positive electrode) and $S_z$ (maximum height roughness of positive electrode) of the positive electrode active material layer may be measured based on ISO 25178 (Geometric Product Specifications (GPS)—Surface texture: areal) standard.

According to the above standard, Sa (arithmetic mean surface roughness of the positive electrode) can be defined as follows:

$$S_a = \frac{1}{A} \int\int [z(x,y)]dxdy \quad \text{[Equation 1]}$$

(in Equation 1, $S_a$ is the arithmetic mean surface roughness of the positive electrode, A is the measurement area, and z(x,y) is the height profile).

According to the above standard, $S_z$ (maximum height roughness of positive electrode) can be defined as follows:

$$S_z = |\text{Max}[z(x,y)]| + |\text{Min}[z(x,y)]| \quad \text{[Equation 2]}$$

(in Equation 2, $S_z$ is the maximum height roughness of the positive electrode, and z(x,y) is the height profile).

$S_a$ (arithmetic mean surface roughness of the positive electrode) of the positive electrode active material layer may be 1 μm or more, 1.5 μm or more, 2 μm or more, 2.5 μm or more, 3 μm or more, 3.5 μm or more, or 4 μm or more, and may be 5 μm or less, 4.9 μm or less, 4.8 μm or less, 4.7 μm or less, 4.6 μm or less, or 4.5 μm or less. If $S_a$ is less than 1 μm, the surface area becomes excessively small, which may cause a problem in that the reactivity of the positive electrode active material is reduced. On the other hand, if $S_a$ exceeds 5 μm, irregularities of the positive electrode is greatly formed, which may induce non-uniform growth of the negative electrode, and may cause stability-related problems such as internal short circuit and ignition of the battery due to the formation of dendrites.

Sz (maximum height roughness of the positive electrode) of the positive electrode active material layer may be 10 μm or more, 15 μm or more, 20 μm or more, 25 μm or more, 30 μm or more, 35 μm or more, 40 μm or more, 45 μm or more, or 50 μm or more and may be 60 μm or less, 59 μm or less, 58 μm or less, 57 μm or less, 56 μm or less, or 55 μm or less. If $S_z$ is less than 10 μm, the surface area becomes excessively small, which may cause a problem in that the reactivity of the positive electrode active material is reduced. On the other hand, if $S_z$ exceeds 60 μm, the irregularities of the positive electrode is greatly formed, which may induce non-uniform growth of the negative electrode, and may cause stability-related problems such as internal short circuit and ignition of the battery due to the formation of dendrites.

The adhesive force between the current collector and the positive electrode active material layer may be 6.5 gf/cm or more, 7 gf/cm or more, or 7.5 gf/cm or more, and may be 9.5 gf/cm or less, 9 gf/cm or less, 8.5 gf/cm or 8 gf/cm or less. Referring to the SEM image of FIG. 7, if the above range is satisfied, the binder is not completely dissolved between the slurries of the positive electrode active material to form a structure in the form of a bridging bond between the particles of the positive electrode active material, thereby improving the bonding force between the positive electrode active materials and having excellent adhesive force of the positive electrode.

The porosity of the positive electrode may be 50% or more, 55% or more, or 60% or more, and may be 80% or less, 75% or less, or 70% or less. If the porosity of the positive electrode is less than 50%, the mass transfer resistance is increased when applied to a battery, and thus the capacity of the electrode may be decreased. If the porosity of the positive electrode exceeds 80%, there may be a problem in that the energy density per volume of the battery is excessively reduced.

The positive electrode for the lithium-sulfur battery comprises a current collector; and a positive electrode active material layer formed on at least one surface of the current collector.

The current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The current collector can enhance the bonding force with the positive electrode active material by having fine irregularities on its surface, and may be formed in various forms such as film, sheet, foil, mesh, net, porous body, foam, or nonwoven fabric.

The positive electrode active material layer comprises a positive electrode active material and a binder.

The positive electrode active material may comprise one selected from the group consisting of elemental sulfur, a sulfur-based compound, a sulfur-carbon composite, and a combination thereof, and may preferably comprise a sulfur-carbon composite.

In the case of sulfur contained in the positive electrode active material, since it is not electrically conductive by itself, it can be used in combination with an electrically conductive material such as carbon material. Accordingly, the sulfur may be comprised in the form of a sulfur-carbon composite.

The loading amount of sulfur in the positive electrode may be 1 to 10 mAh/cm², preferably 2 to 8 mAh/cm², more preferably 3 to 6 mAh/cm².

The carbon included in the sulfur-carbon composite is a porous carbon material that provides a skeleton to which the sulfur can be uniformly and stably fixed, and compensates for the low electrical conductivity of sulfur so that the electrochemical reaction can be smoothly proceeded.

The porous carbon material can be generally produced by carbonizing precursors of various carbon materials. The porous carbon material may comprise uneven pores therein, the average diameter of the pores is in the range of 1 to 200 nm and the porosity may be in the range of 10 to 90% of the total volume of the porous carbon material. If the average diameter of the pores is less than the above range, the pore size is only at the molecular level, and impregnation with sulfur is impossible. On the contrary, if the average diameter of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); graphites such as natural graphite, artificial graphite, expanded graphite and activated carbon.

The preparation method of the sulfur-carbon composite is not particularly limited in the present invention, and a method commonly used in the art may be used.

The positive electrode may further comprise at least one additive selected from a transition metal element, a group IIIA element, a group IVA element, a sulfur compound of these elements, and an alloy of these elements and sulfur, in addition to the positive electrode active material.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Ti and the like, and the group IVA element may comprise Ge, Sn, Pb, and the like.

The binder maintains the positive electrode active materials in current collector and organically connects between the positive electrode active materials to further increase the binding force therebetween, and any binder known in the art can be used as the binder.

For example, the binder may comprise one selected from the group consisting of polyvinylidene fluoride, polytetrafluoroethylene, polyvinylpyrrolidone, styrene butadiene rubber, acrylonitrile-butydiene rubber, styrene-isoprene rubber, carboxymethylcellulose, and combinations thereof.

In addition, Lithium Carboxymethyl Cellulose (Li-CMC) in which lithium ions are substituted in carboxymethyl cellulose may be included as a binder. Carboxymethyl cellulose (CMC) has a risk of explosion due to the generation of hydrogen gas by hydrogen ions contained in the carboxyl group during battery operation. In the case of sodium carboxymethyl cellulose (Na-CMC) in which sodium ions ($Na^+$) are substituted for hydrogen ions ($H^+$), the lifetime characteristics may deteriorate due to sodium ions, whereas when using Li-CMC as a binder, the effect of relatively excellent stability and improved lifetime characteristics can be exhibited.

The positive electrode active material layer may further comprise an electrically conductive material.

The electrically conductive material is a material that acts as a path, through which electrons are transferred from the current collector to the positive electrode active material, by electrically connecting the electrolyte and the positive electrode active material. The electrically conductive material can be used without limitation as long as it has electrical conductivity.

For example, as an electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The slurry of the positive electrode active material for forming the positive electrode active material layer may further comprise a solvent.

As the solvent, one capable of uniformly dispersing a positive electrode active material, an electrically conductive material, and a binder is used. Such a solvent is an aqueous solvent, and water is most preferred, and in this case, water may be distilled water or de-ionized water. However, it is not necessarily limited thereto, and if necessary, a lower alcohol that can be easily mixed with water may be used. Examples of the lower alcohol include methanol, ethanol, propanol, isopropanol, and butanol, and preferably, they may be used in combination with water.

Method of Manufacturing Positive Electrode for Lithium-Sulfur Battery

A method of manufacturing a positive electrode for a lithium-sulfur battery according to the present invention comprises the steps of, (1) mixing the sulfur-carbon composite and the binder and then adding water to prepare a slurry of positive electrode active material; (2) placing the slurry of the positive electrode active material on the current collector and then covering it with a release film to prepare a structure in the order of the current collector—the slurry—the release film; (3) compressing the structure using a roll press; (4) removing the release film from the compressed structure to prepare a positive electrode; and (5) drying the positive electrode, wherein the solid concentration of the slurry of the positive electrode active material in step (1) is 50 to 70 wt. %.

The method of manufacturing the positive electrode for the lithium-sulfur battery comprises a step of (1) mixing the sulfur-carbon composite and the binder and then adding water to prepare a slurry of positive electrode active material. The step (1) may be a step of mixing the sulfur-carbon composite and the binder at 90:10 to 98.5:1.5, preferably 93:7 to 98:2, more preferably 96:4 to 97.5:2.5. If the ratio is less than the above range, the slurry of the positive electrode active material is not detached from the release film, which may cause a problem in manufacturing the positive electrode. On the other hand, if the ratio exceeds the above range, there may be a problem that as the binder content is lowered, the positive electrode active material layer is detached from the current collector.

In the step of preparing the slurry of the positive electrode active material of step (1), a step of adding an electrically conductive material to the mixture of sulfur-carbon composite and binder may be further comprised. Specifically, it is possible to prepare a slurry of a positive electrode active material by mixing the sulfur-carbon composite and the binder as well as the electrically conductive material and adding water.

The electrically conductive material is a material that acts as a path, through which electrons are transferred from the current collector to the positive electrode active material, by electrically connecting the electrolyte and the positive electrode active material. The electrically conductive material can be used without limitation as long as it has electrical conductivity.

For example, as an electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

In the present specification, the solid concentration is defined as the mass fraction of the solid material excluding the solvent in the slurry mixture.

The solid concentration of the slurry of the positive electrode active material prepared by mixing the sulfur-carbon composite and the binder and then adding water may be 50 wt. % or more, 52 wt. % or more, 54 wt. % or more, 56 wt. % or more, or 58 wt. % or more and may be 70 wt. % or less, 68 wt. % or less, 66 wt. % or less, 64 wt. % or less, or 62 wt. % or less. If the solid concentration is less than 50 wt. %, the drying time may be prolonged, and thus the production speed of the positive electrode may be reduced. On the other hand, if the solid concentration exceeds 70 wt. %, the adhesive force of the slurry of the positive electrode active material is lowered, so that it may be difficult to manufacture the positive electrode.

The method of manufacturing the positive electrode for the lithium-sulfur battery comprises a step of (2) placing the slurry of the positive electrode active material on the current collector and then covering it with a release film to prepare a structure in the order of the current collector—the slurry—the release film.

The release film is to prevent the slurry of the positive electrode active material from being attached to the roll and not being detached in the roll press process for compression and may be a release film made of polyethylene terephthalate (PET), polypropylene (PP), high density polyethylene (HDPE), low density polyethylene (LDPE), and preferably, it may be a release film formed by coating a silicone or a fluorine-based hydrophobic material on the polymer material, but is not particularly limited thereto.

The method of manufacturing the positive electrode for the lithium-sulfur battery comprises a step of (3) compressing the structure using a roll press.

By passing the structure having the order of the current collector-slurry-release film through a roll press, a slurry of a positive electrode active material having a high solid concentration is compressed by a roll to form a positive electrode having a constant thickness. The roll press may be composed of two parallel rolls, and the loading of the produced positive electrode may be controlled by adjusting the gap between the rolls, that is, the roll gap.

In the pressing step using the roll press, the roll gap may be 100 μm or more, 115 μm or more, 130 μm or more, or 145 μm or more, and may be 200 μm or less, 185 μm or less, 170 μm or less, or 155 μm or less. If the roll gap is less than 100 μm, there may be a problem in that due to the positive electrode active material having a larger particle size than the roll gap contained in the slurry of the positive electrode active material, the positive electrode cannot be formed with a uniform thickness. On the other hand, if the roll gap exceeds 200 μm, since the positive electrode has an excessively high loading, the cracking and detachment phenomenon on the surface of the positive electrode may be intensified.

The method of manufacturing the positive electrode for the lithium-sulfur battery comprises a step of (4) removing the release film from the compressed structure to prepare a positive electrode.

Through the pressing process through the roll press, the slurry of the positive electrode active material was spread to a uniform thickness to form a positive electrode, and thus it is necessary to remove the release film before going through the final drying process. When drying without removing the release film, heating and drying time are increased, which may increase the cost of the drying process as well as decrease the production speed of the positive electrode manufacturing process.

The method of manufacturing the positive electrode for the lithium-sulfur battery comprises a step of (5) drying the positive electrode.

Step (5) is a step of drying by heating the moisture contained in the slurry of the positive electrode active material, preferably through an oven. By removing the moisture contained in the slurry of the positive electrode active material through the drying, it is possible to finally manufacture a positive electrode.

The drying temperature in step (5) may be 40° C. or more, 45° C. or more, or 50° C. or more, and may be 90° C. or less, 85° C. or less, 80° C. or less. If the drying temperature is less than 40° C., since the drying time of the positive electrode active material is prolonged, it is difficult to obtain the effect of reducing the cost of the drying process and improving the production speed of the positive electrode according to the decrease of the drying time. On the other hand, if the drying temperature exceeds 90° C., there may be a problem in that sulfur in the positive electrode active material is sublimated, reducing the loading of the positive electrode.

Lithium-Sulfur Battery

The lithium-sulfur battery according to the present invention may comprise a positive electrode; a negative electrode; a separator interposed between the positive electrode and the negative electrode; and an electrolyte.

The positive electrode is as described above in this specification.

The negative electrode may comprise a negative electrode current collector and a negative electrode active material layer coated on one or both surfaces of the negative electrode current collector. Alternatively, the negative electrode may be a lithium metal plate.

The negative electrode current collector is for supporting the negative electrode active material layer and is not particularly limited as long as it has high electrical conductivity without causing any chemical change in the battery. The negative electrode current collector may be selected from the group consisting of copper, aluminum, stainless steel, zinc, titanium, silver, palladium, nickel, iron, chromium, alloys thereof, and combinations thereof. The stainless steel may be surface-treated with carbon, nickel, titanium, or silver. The alloy may be an aluminum-cadmium alloy. In addition, sintered carbon, a nonconductive polymer surface-treated with an electrically conductive material, or an electrically conductive polymer may be used. In general, copper foil is used as the negative electrode current collector.

Also, in relation to its shape, various forms such as film, sheet, foil, net, porous body, foam, or nonwoven fabric in which fine irregularities are formed/unformed on the surface may be used.

The negative electrode active material layer may comprise an electrically conductive material, a binder, etc. in addition to the negative electrode active material. At this time, the electrically conductive material and the binder are as described above.

The negative electrode active material may comprise a material capable of reversibly intercalating or de-intercalating lithium ($Li^+$), a material capable of reacting with lithium ion to reversibly form lithium containing compounds, lithium metal, or lithium alloy.

The material capable of reversibly intercalating or de-intercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or a lithium metal powder.

The method of forming the negative electrode active material is not particularly limited, and a method of forming a layer or film commonly used in the art may be used. For example, methods such as compression, coating, and deposition may be used. In addition, a case, in which a thin film of metallic lithium is formed on a metal plate by initial charging after assembling a battery without a lithium thin film in the current collector, may also be comprised in the negative electrode of the present invention.

The electrolyte solution is not particularly limited as long as it is a non-aqueous solvent serving as a medium through which ions involved in the electrochemical reaction of the battery can move. For example, the solvent may be a carbonate-based solvent, an ester-based solvent, an ether-based solvent, a ketone-based solvent, an alcohol-based solvent, or an aprotic solvent. Examples of the carbonate-based solvent may specifically comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically comprise methyl acetate, ethyl acetate, n-propyl acetate, 1,1-dimethyl ethyl acetate, methyl propionate, ethyl propionate, γ-butyrolactone, decanolide, valerolactone, mevalonolactone, or carprolactone, etc. Examples of the ether-based solvent may specifically comprise diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, or polyethylene glycol dimethyl ether, etc. Examples of the ketone-based solvent may specifically comprise cyclohexanone, etc. Examples of the alcohol-based solvent may specifically comprise ethylalcohol, or isopropylalcohol, etc. Examples of the aprotic solvent may specifically comprise nitriles such as acetonitrile, amides such as dimethylformamide, dioxolanes such as 1,3-dioxolane (DOL), or sulfolane, etc. The non-aqueous organic solvents may be used alone or in combination of one or more. The mixing ratio when using in combination of one or more can be appropriately adjusted depending on the desired performance of the battery. In particular, a mixture of 1,3-dioxolane and dimethoxyethane in a volumetric ratio of 1:1 may be preferable.

The injection of the electrolyte may be performed at an appropriate stage during the manufacturing process of the lithium-sulfur battery depending on the manufacturing process and required properties of the final product. That is, it can be applied before assembling a lithium-sulfur battery or at the final stage of assembly.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator may be used without any particular limitation as long as it is used as a separator in a lithium-sulfur battery. The separator may be an independent member such as a film or a coating layer added to the positive electrode and/or the negative electrode.

The separator may be made of a porous substrate. Any of the porous substrates can be used as long as it is a porous substrate commonly used in a lithium-sulfur battery. A porous polymer film may be used alone or in the form of a laminate. For example, a non-woven fabric made of high melting point glass fibers, or polyethylene terephthalate fibers, etc. or a polyolefin-based porous membrane may be used, but is not limited thereto.

The material of the porous substrate is not particularly limited in the present invention, and any material can be used as long as it is a porous substrate commonly used in an electrochemical device. For example, the porous substrate may comprise one or more materials selected from the group consisting of polyolefins such as polyethylene and polypropylene, polyesters such as polyethylene terephthalate and polybutylene terephthalate, polyamide, polyacetal, polycarbonate, polyimide, polyetherether ketone, polyethersulfone, polyphenylene oxide, polyphenylenesulfide, polyethylene naphthalene, polytetrafluoroethylene, polyvinylidene fluoride, polyvinylchloride, polyacrylonitrile, cellulose, nylon, poly(p-phenylene benzobisoxazole) and polyarylate.

The thickness of the porous substrate is not particularly limited, but may be 1 to 100 μm, preferably 5 to 50 μm. Although the thickness range of the porous substrate is not particularly limited to the above-mentioned range, if the thickness is excessively thinner than the lower limit described above, mechanical properties are deteriorated and thus the separator may be easily damaged during use of the battery.

The average diameter and porosity of the pores present in the porous substrate are also not particularly limited, but may be 0.1 to 50 μm and 10 to 95%, respectively.

In the case of the lithium-sulfur battery according to the present invention, it is possible to perform laminating or stacking and folding processes of the separator and the electrode, in addition to the winding process which is a general process.

The shape of the lithium-sulfur battery is not particularly limited, and may have various shapes such as a cylindrical type, a stacked type, and a coin type.

Mode for Invention

Hereinafter, preferred examples are presented to help the understanding of the present invention, but the following examples are provided only to make the present invention easier to understand, and the present invention is not limited thereto.

Manufacturing of Positive Electrode for
Lithium-Sulfur Battery: Examples 1 to 2 and
Comparative Examples 1 to 5

Example 1

97 wt. % of sulfur-carbon composite (S:C=70:30 (weight ratio)) and 3 wt. % of Li-CMC (Lithium-Carboxymethyl Cellulose) as a binder in the form of solid powder were mixed, and then water was added thereto to prepare a slurry of positive electrode active material having a solid concentration of 60 wt. %.

The prepared positive electrode active material slurry was placed on one side of an aluminum current collector, and then a PET release film (Mitsubishi, MRF-125, thickness 125 μm) was covered on the slurry to prepare a structure having the order of current collector-slurry-release film. Thereafter, the structure was put into the Roll-Press and the process of compression was performed while adjusting the roll gap to 120 μm.

After compression, the release film was removed from the structure, put in an oven, and dried by heating at a temperature of 50° C. to manufacture a positive electrode having a porosity of 63% and a sulfur loading amount of 3.65 mAh/cm².

Example 2

Sulfur-carbon composite (S:C=75:25), carbon fiber as a conductive material, and Li-CMC (Lithium-Carboxymethyl Cellulose) as a binder in solid powder form were mixed in a weight ratio of 92:5:3, and water was added thereto to prepare a slurry of positive electrode active material having a solid concentration of 55 wt. %.

Except for the method of preparing the slurry of the positive electrode active material, the same method as Example 1 was performed to manufacture a positive electrode having a porosity of 63% and a sulfur loading amount of 3.4 mAh/cm².

Comparative Example 1

Sulfur-carbon composite (S:C=70:30 (weight ratio)), and an aqueous solution of Li-CMC (Lithium Carboxymethyl Cellulose) at a concentration of 2 wt. % as a binder were mixed so that the weight ratio of the solid content of the sulfur-carbon composite and Li-CMC was 97:3, and then water was further added thereto to prepare a slurry of positive electrode active material having a solid concentration of 30 wt. %.

Thereafter, except that the slurry of the positive electrode active material was coated on one side of the aluminum current collector using a blade coater (Mathis Switzerland, SV-M) and dried in an oven at 50° C., the same method as Example 1 was performed to manufacture a positive electrode for lithium-sulfur battery and at this time, the porosity of the manufactured positive electrode was 78%.

Comparative Example 2

A positive electrode for a lithium-sulfur battery was manufactured in the same way as in Example 1, except for drying by heating without removing the release film.

Comparative Example 3

A positive electrode for lithium-sulfur battery was prepared by putting the positive electrode manufactured in Comparative Example 1 into the roll-press and performing an additional compression process while adjusting the roll gap to 50 μm, and at this time, the porosity of the manufactured positive electrode was 63%.

Comparative Example 4

Sulfur-carbon composite (S:C=75:25 (weight ratio)), carbon fiber as an electrically conductive material and an aqueous solution of Li-CMC (Lithium Carboxymethyl Cellulose) at a concentration of 2 wt. % as a binder were mixed so that the weight ratio of the solid content of the sulfur-carbon composite and Li-CMC was 92:5:3, and then water was further added thereto to prepare a slurry of positive electrode active material having a solid concentration of 30 wt. %.

Except for the method of preparing the slurry of the positive electrode active material, the same method as Comparative Example 1 was performed to manufacture a positive electrode having a porosity of 69% and a sulfur loading amount of 3.4 mAh/cm².

Comparative Example 5

A positive electrode for a lithium-sulfur battery was manufactured by putting the positive electrode manufactured in Comparative Example 4 into the roll-press, and performing an additional compression process while adjusting the roll gap to 50 μm, and at this time, the porosity of the manufactured positive electrode was 63%.

Manufacture of Lithium-Sulfur Battery: Example 3 and Comparative Example 6

Example 3

The positive electrode prepared in Example 2 and the negative electrode of lithium metal having a thickness of 45 μm were positioned to face each other, and then, a polyethylene separator having a thickness of 20 μm and a porosity of 46% was interposed between the positive electrode and the negative electrode.

In addition, as the electrolyte, 1M LiTFSI and 3 wt. % of lithium nitrate (LiNO3) was injected while using 1,3-dioxolane (DOL)/dimethoxyethane (DME) (1:1, v/v) as the solvent to manufacture a coin cell type lithium-sulfur battery.

Comparative Example 6

A coin cell type lithium-sulfur battery was prepared in the same manner as in Example 3, except that the positive electrode manufactured in Comparative Example 5 was used.

Experimental Example 1: Measurement of Drying Time when Manufacturing Positive Electrode for Lithium-Sulfur Battery When manufacturing the positive electrodes of Example 1 and Comparative Examples 1 and 2, the drying time (min) and drying rate (%) required to remove the solvent from the slurry of the positive electrode active material were measured, and the results are shown in FIG. 3.

Specifically, in the case of the drying rate, the mass of residual moisture over time was measured and calculated using the following formula:

Drying rate (%)=(1−((mass of residual moisture)/(mass of initial moisture)))×100

Figure 1:
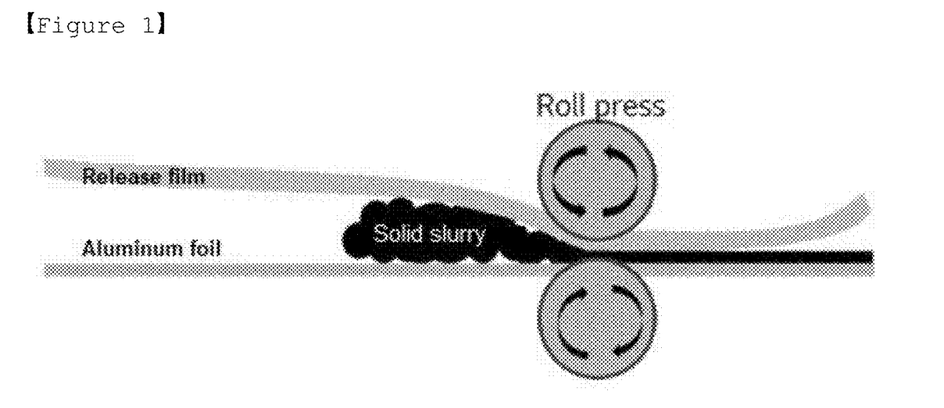
FIG. 1 shows a schematic diagram of the manufacturing process of the positive electrode of Examples 1 and 2 of the present invention.
Figure 2:
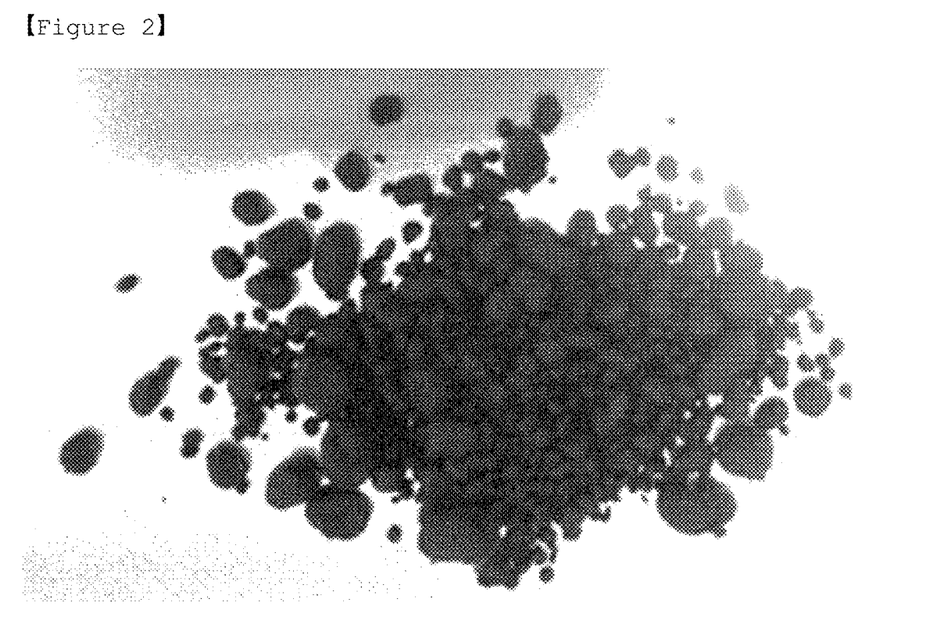
FIG. 2 is a photograph taken from the slurry of the positive electrode active material having a high solid content prepared in Example 1 of the present invention.
Figure 3:
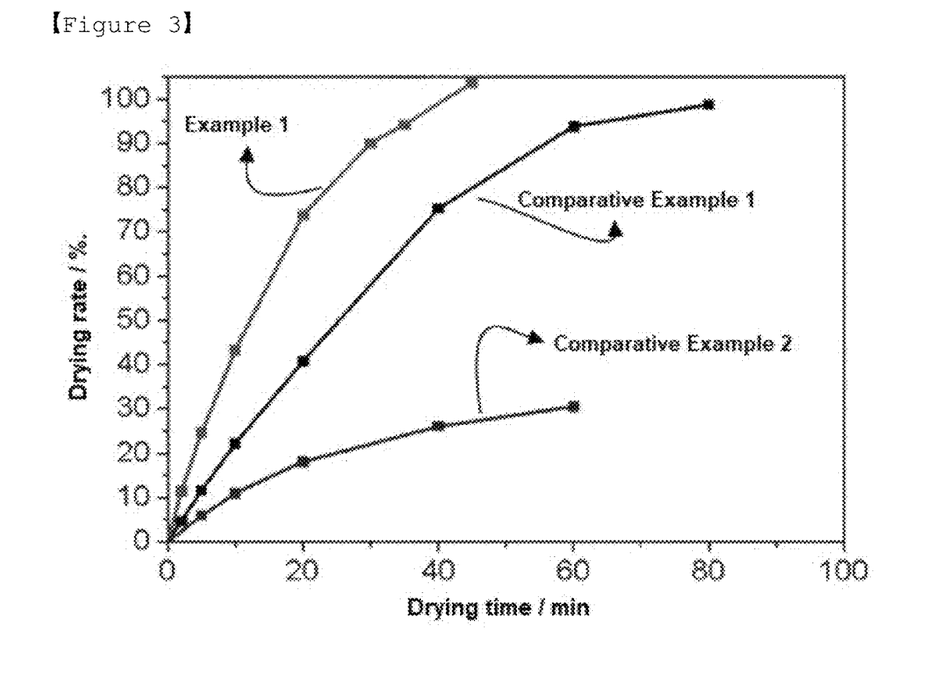
FIG. 3 is a graph showing the measurement of the drying rate depending on the drying time during the manufacture of the positive electrodes according to Example 1 of the present invention and Comparative Examples 1 and 2.

As shown in FIG. 3, for Example 1, 95% or more of the solvent contained in the slurry was removed in 35 minutes, whereas Comparative Example 1 took 60 minutes to achieve the same drying rate. In addition, it was found that Comparative Example 2, dried with a release film covered, has a relatively slower drying speed compared to Example 1 and Comparative Example 1.

Through the above results, it was confirmed through the above results that in the case of Example 1, in which a positive electrode was manufactured by using a slurry having a solid concentration of 50 to 70 wt. % and applying a roll press process, the drying time was significantly reduced compared to Comparative Examples 1 and 2.

Figure 4:
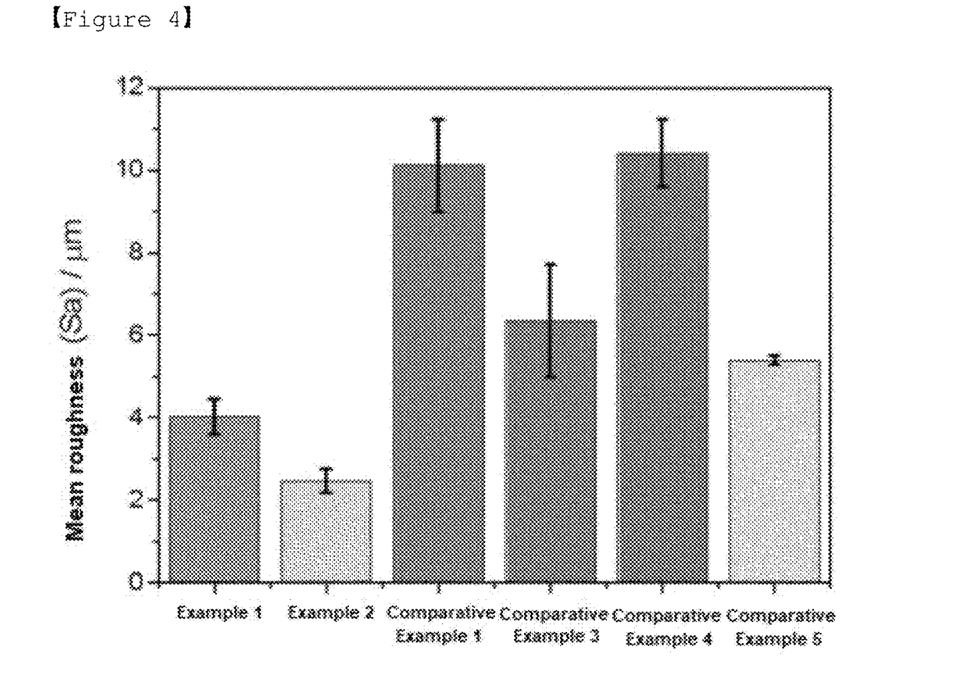
FIG. 4 is a graph showing the arithmetic mean surface roughness ($S_a$) of the positive electrodes according to Examples 1 to 2 of the present invention and Comparative Examples 1 and 3 to 5.
Figure 5:
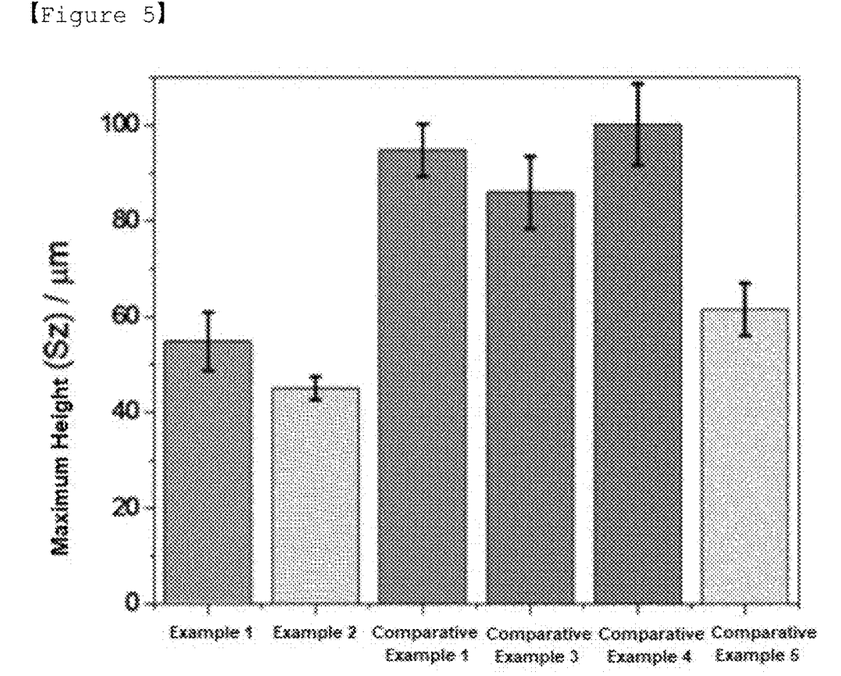
FIG. 5 is a graph showing the maximum height roughness ($S_z$) of the positive electrodes according to Examples 1 to 2 of the present invention and Comparative Examples 1 and 3 to 5.

Experimental Example 2: Measurement of Surface Characteristics of Positive Electrode for Lithium-Sulfur Battery For the positive electrodes prepared in Examples 1 to 2 and Comparative Examples 1 and 3 to 5, the surface roughness was measured using a measuring instrument (KEYENCE, VK-X150). Through this, $S_a$ (the arithmetic mean surface roughness of the positive electrode (arithmetic mean height): the average value of the distance from the middle surface of the irregularity structure of the surface of the positive electrode to the highest and lowest points of each irregularity part) and $S_z$ (maximum height roughness of positive electrode (maximum height): distance from lowest point to highest point of positive electrode) were measured, and the results are shown in Table 1 and FIGS. 4 and 5 below.

TABLE 1

|  | $S_a$ (μm) | $S_z$ (μm) |
| --- | --- | --- |
| Example 1 | 4.03 | 54.8 |
| Example 2 | 2.463 | 45.05 |
| Comparative Example 1 | 10.13 | 94.8 |
| Comparative Example 3 | 6.34 | 85.9 |
| Comparative Example 4 | 10.42 | 100.2 |
| Comparative Example 5 | 5.39 | 61.53 |

As shown in Table 1, it could be confirmed that in the case of Examples 1 and 2, in which the positive electrodes were manufactured by using a slurry having a high solid concentration of 50 to 70 wt. % and applying a roll press process, the surface roughness is small, the irregularities are small, and the surface is flatter, as compared to Comparative Example 1 or Comparative Examples 3 to 5 in which a positive electrode was prepared using a slurry with a low solid concentration.

Through this, it was found that in the case of the positive electrodes manufactured through Examples 1 and 2, the surface irregularities are relatively small, and the non-uniform growth of the negative electrode or the formation of dendrites can be prevented, thereby improving the stability of the battery.

Experimental Example 3: Adhesive Force Measurement of Positive Electrode for Lithium-Sulfur Battery The positive electrodes prepared in Example 1 and Comparative Examples 1 and 3 were cut to a size of 100 mm×20 mm, and then adhered to the slide glass using a double-sided tape (3M 9070) with the electrode side, and a laminator (GMP, PHOTONEX-SYNC325) was used to prepare a sample for a peel test.

Figure 6:
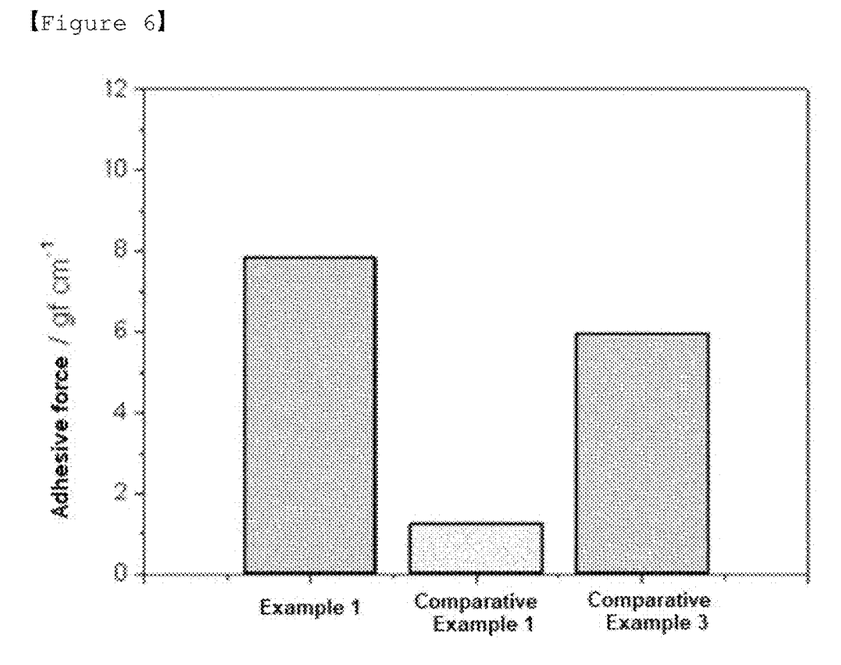
FIG. 6 is a graph showing the measurement of the adhesive force of the positive electrodes according to Example 1 of the present invention and Comparative Examples 1 and 3.

A 90° peel test was performed using a universal tester (AMETEK, LS1) capable of measuring the adhesive force on the sample for the peel test, and thus the peeling resistance (gf/cm) applied was measured, and the adhesive force of each electrode was then calculated, and the results are shown in Table 2 and FIG. 6 below.

TABLE 2

|  | Example 1 | Comparative Example 1 | Comparative Example 3 |
| --- | --- | --- | --- |
| Adhesive force(gf/cm) | 7.83 | 1.27 | 5.98 |

Figure 7:
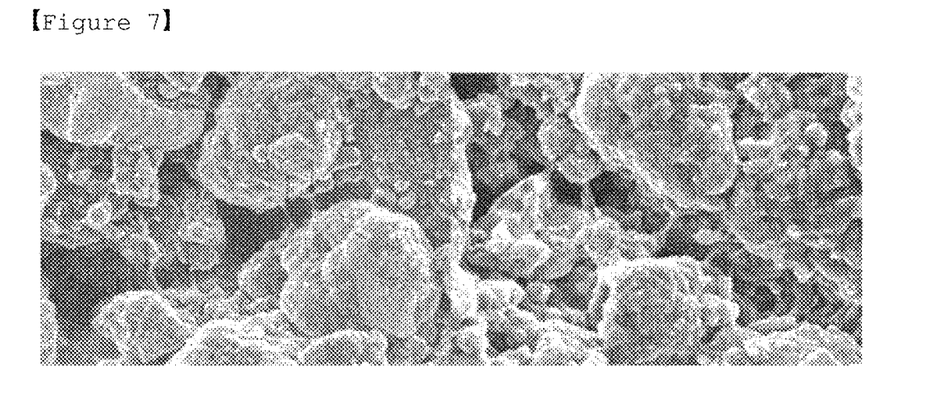
FIG. 7 is a SEM image of the surface of the positive electrode according to Example 1 of the present invention.

In addition, an image taken using a scanning electron microscope (SEM) (JEOL, JSM-7200F) for the positive electrode active material of Example 1 was shown in FIG. 7.

It was confirmed through the above results that in the case of a slurry of a positive electrode active material having a high solid concentration of 50 to 70 wt. % as in Example 1, the slurry was not completely dissolved in the binder, so it has a bridge-type structure between active materials, and thus the adhesive force of the positive electrode is improved.

Experimental Example 4: Measurement of Initial Expression Capacity of Lithium-Sulfur Battery For lithium-sulfur batteries manufactured in Example 3 and Comparative Example 6, the initial discharging capacity from 2.5V to 1.8V was measured using a charge/discharge measuring device (PESC 05-0.01, PNE Solution, Korea), and the results are shown in FIG. 8.

Figure 8:
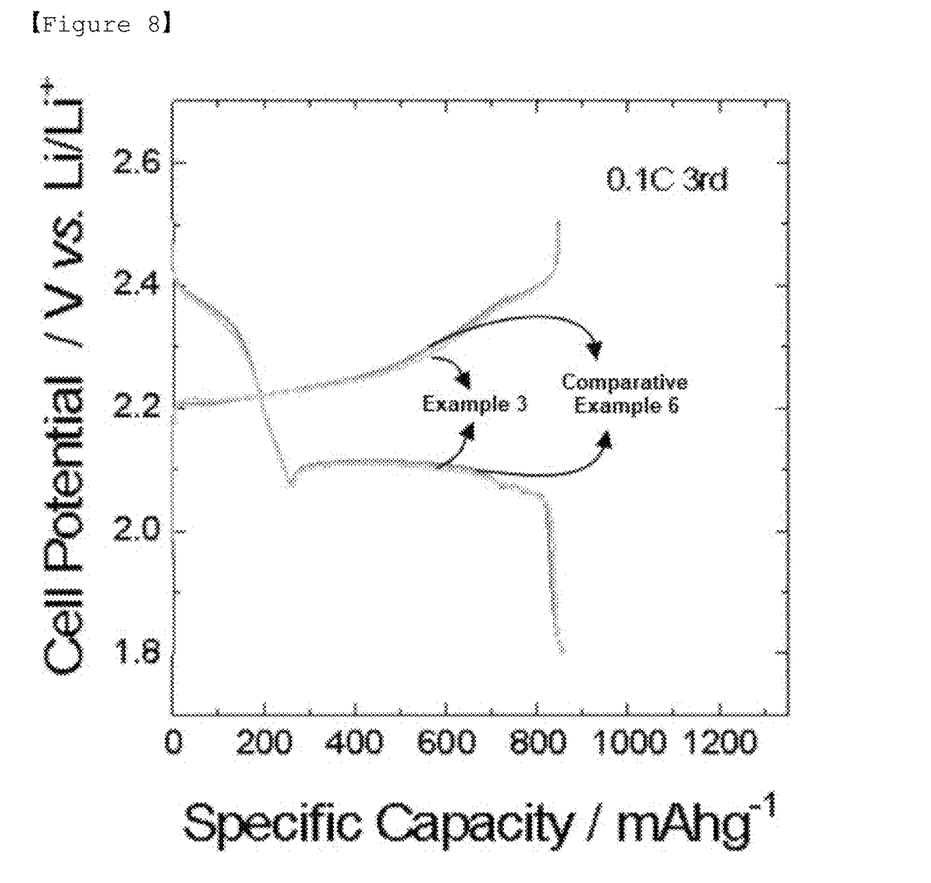
FIG. 8 is a graph showing the initial expression capacity of the lithium-sulfur batteries according to Example 3 of the present invention and Comparative Example 6.

Through the results of FIG. 8, it was confirmed that in the case of a lithium-sulfur battery comprising a positive electrode manufactured by using a slurry having a high solids concentration of 50 to 70 wt. % and applying a roll press process, as described in Example 3, although the cost of the drying process is reduced and the production speed of the positive electrode is improved, due to the marked reduction of the drying time in the positive electrode manufacturing process, it shows the same level of initial expression capacity, relative to a lithium-sulfur battery in which a positive electrode was manufactured using a slurry with a low solid content, as described in Comparative Example 6.

Simple modifications or changes of the present invention are all within the scope of the present invention, and the specific scope of protection of the present invention will be made clear by the appended claims.

The invention claimed is:

1. A positive electrode for a lithium-sulfur battery, comprising:
    a current collector; and
    a positive electrode active material layer on at least one surface of the current collector,
    wherein the positive electrode active material layer comprises a positive electrode active material and a binder, and
    the positive electrode active material layer has surface properties defined by the following $S_a$ and $S_z$:
    (i) 1 μm≤$S_a$≤5 μm
    (ii) 10 μm≤$S_z$≤60 μm
    wherein $S_a$ is the average value of the distance from the middle surface of the surface irregularity structure of the positive electrode to the highest point and the lowest point of each irregularity part, and
    $S_z$ is the distance from the lowest point to the highest point of the positive electrode.

2. The positive electrode for the lithium-sulfur battery according to claim 1, wherein an adhesive force between the current collector and the positive electrode active material layer is 6.5 to 9.5 gf/cm.

3. The positive electrode for the lithium-sulfur battery according to claim 1, wherein a porosity of the positive electrode is 50 to 80%.

4. The positive electrode for the lithium-sulfur battery according to claim 1, wherein a sulfur loading amount of the positive electrode is 1 to 10 mAh/cm$^2$.

5. The positive electrode for the lithium-sulfur battery according to claim 1, wherein the positive electrode active material comprises at least one selected from the group consisting of elemental sulfur, sulfur-based compounds, and sulfur-carbon composites.

6. A method of manufacturing a positive electrode for a lithium-sulfur battery comprises:
- (1) mixing a sulfur-carbon composite and a binder and then adding water to prepare a slurry of positive electrode active material;
- (2) placing the slurry of the positive electrode active material on a current collector and then covering it with a release film to prepare a structure in the order of the current collector—the slurry—the release film;
- (3) compressing the structure using a roll press;
- (4) removing the release film from the compressed structure to prepare a positive electrode; and
- (5) drying the positive electrode,
- wherein a solid concentration of the slurry of the positive electrode active material in (1) is 50 to 70 wt. %.

7. The method of manufacturing the positive electrode for the lithium-sulfur battery according to claim 6, wherein step (1) is a step which comprises mixing the sulfur-carbon composite and the binder in a ratio of 90:10 to 98.5:1.5.

8. The method of manufacturing the positive electrode for the lithium-sulfur battery according to claim 6, wherein in step (3), a roll gap of the roll press is 100 to 200 µm.

9. The method of manufacturing the positive electrode for the lithium-sulfur battery according to claim 6, wherein the drying is by heating, and the drying temperature is 40 to 90° C.

10. A lithium-sulfur battery comprising the positive electrode according to claim 1.

* * * * *